United States Patent [19]

Wellard

[11] Patent Number: 4,596,363
[45] Date of Patent: Jun. 24, 1986

[54] CONTAINER AND SPREADER PACKAGE

[76] Inventor: Kenneth E. Wellard, 2496 E. Woodthrush Dr., Sandy, Utah 84092

[21] Appl. No.: 621,611

[22] Filed: Jun. 18, 1984

[51] Int. Cl.$^4$ .............................................. A01G 25/14
[52] U.S. Cl. ............................... 239/374; 222/465 R; 222/565; 239/375
[58] Field of Search ................................. 239/374–377; 222/196.1–196.5, 465 R, 480, 547, 564, 565

[56] References Cited

U.S. PATENT DOCUMENTS

| | | | |
|---|---|---|---|
| 934,283 | 9/1909 | Case | 222/465 R |
| 1,087,727 | 2/1914 | Case | 222/565 |
| 1,558,396 | 10/1925 | Roehrs | 222/564 |
| 1,714,368 | 5/1929 | Hobson | 222/565 X |
| 2,748,996 | 6/1956 | Fritschi, Jr. | 222/547 X |
| 3,323,683 | 6/1967 | Cianciolo | 222/480 X |

FOREIGN PATENT DOCUMENTS 2315579  9/1974  Fed. Rep. of Germany ...... 222/565

Primary Examiner—Jeffrey V. Nase
Attorney, Agent, or Firm—Thorpe, North and Western

[57] ABSTRACT

A combination container and spreader package for particulate material is disclosed. The combination comprises a container having a side wall and bottom for holding the particulate matter. Openings are provided in the side wall adjacent the juncture of the side wall and the bottom. A handle is provided whereby the container can be oscillated about a vertical axis. The oscillatory movement forces the particular material from the openings in the container and evenly spreads the material over the ground.

2 Claims, 4 Drawing Figures

CONTAINER AND SPREADER PACKAGE

BACKGROUND OF THE INVENTION

1. Field

The present invention relates to manually operated spreaders for particulate material such as fertilizer, grass seed and the like, and in particular, the invention relates to hand held container and spreader package for spreading particulate material.

2. State of the Art

Conventionally, particulate material, such as fertilizer, grass seed and the like, has been spread or distributed on a surface such as the ground or a lawn, using a hopper-type spreader which is supported on wheels and adapted to be pushed across the ground or lawn. Such spreaders are heavy, bulky and relatively expensive. These spreaders further require frequent cleaning and, of course, must be stored between use. The particulate material to be used with such spreaders must be purchased separately, and portions of the particulate material must be transferred from the separate package of the particulate material to the spreader.

Portable, body supported spreading devices have been used wherein a disc or other rotating member is manually activated to distribute the particulate material. The body supported spreaders conventionally have a self-contained bag or container means which must be filled from a separate supply container of the particulate material. The body supported, portable spreaders are sufficiently expensive to preclude them being disposed of after they have been used, and, thus, they generally must be cleaned and stored between uses.

OBJECTIVES

A principal objective of the present invention is to provide an inexpensive, hand manipulated, hand carried, portable container and spreader package. A particular objective of the invention is to provide a combination container and spreader package in which particulate material is packaged for sale, and which can be utilized by the purchasing consumer as a self-contained spreader for distributing the packaged particulate material. A further objective of the invention is to provide a combination container and spreader package which is relatively inexpensive and can, therefore, be disposed of after the spreader package has been used to spread the particulate material contained therein.

SUMMARY OF THE INVENTION

The above objectives are achieved in accordance with the invention by the provision of a novel combination container and spreader package. The combination container and spreader package comprises wall means and bottom means which define a container for holding the particulate material. A plurality of openings are provided in the wall means with the openings being spaced around the bottom portion of the wall means so that the openings are located adjacent to the juncture of the wall means and the bottom means. A handle means extends from the wall means of the container in a manner whereby the handle means can be manually grasped so as to (1) support the container in a position in which the wall means are generally upright and (2) manually move the container in oscillatory movement about a vertical axis.

In one preferred embodiment of the invention, the container and spreader package has a cover means attached to the top of the wall means, and the container and spreader package is sold with the particulate material contained within the package. The user purchases the package which comprises the container filled with the particulate material and a self contained spreader for efficiently spreading the particulate material from the container. Advantageously, removable means are provided for covering the openings in the side wall, whereby the openings can be uncovered when the particulate material is to be discharged from the container and spreader package. The container and spreader package is inexpensive and can simply be discarded after the particulate material has been discharged therefrom. The container and spreader package thus serves the function of an inexpensive shipping and display container as well as a convenient, self contained, discardable means for efficiently spreading the particulate material contained therein. Alternatively, the package can be provided with an open top or removable cover means whereby particulate material can be transferred from bulk containers to the container and spreader package, whereby the container and spreader package can be refilled repetitively for use in spreading the particulate material from the bulk container over the desired area.

Additional objects, features and advantages of the present invention will become apparent from a consideration of the following detailed description and accompanying drawings.

BRIEF DESCRIPTION OF THE DRAWINGS

A combination container and spreader for particulate material in accordance with the present invention and which incorporates the best mode presently contemplated of carrying out the invention, is illustrated in the drawings in which.

DETAILED DESCRIPTION OF THE PREFERRED EMBODIMENTS

Figure 1:
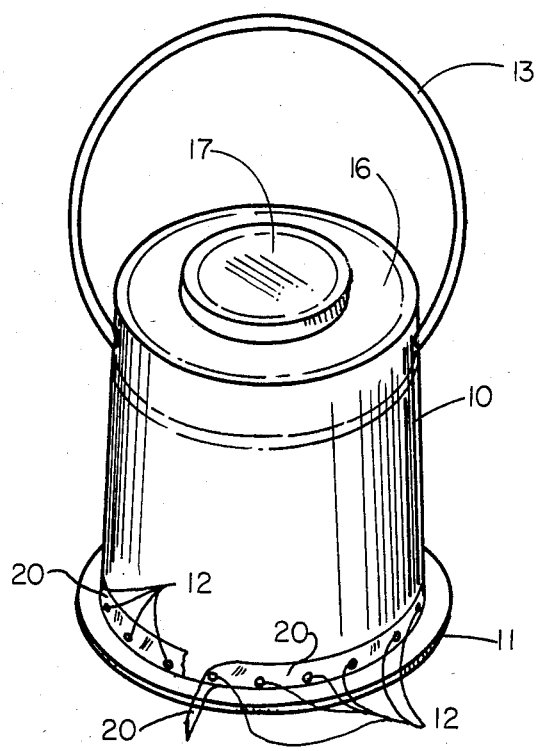
FIG. 1 is a pictorial view of the combination container and spreader package with a portion of the package being shown in exploded, cross-sectional detail.

Referring to FIG. 1 initially, there is shown one preferred embodiment of a combination container and spreader package in accordance with the present invention. The combination container and spreader package comprises wall means 10, which as illustrated, takes the form of a generally cylindrical wall. The cylindrical wall 10 may taper inwardly, i.e., the diameter of the cylindrical wall 10 is somewhat greater at the base thereof than at the top. It should be recognized, that the cylindrical shape, per se, is not critical. The wall means can be of any desired shape such as square, rectangular, or polygonal. The only requirement being that the wall means is closed, i.e., that the wall means circumscribes and forms a wall enclosure about a given space or volume.

A bottom means, such as the bottom wall 11 is attached to the bottom of the wall means whereby the wall means 10 and the bottom means 11 define a container capable of holding a particulate material, such as granulated fertilizer or seed, etc. A plurality of openings 12 are provided through the wall means 10. The openings 12 are spaced around the bottom portion of the wall means 10 so that the openings 12 are adjacent to the juncture of the wall means 10 and the bottom means 11. The openings 12 are preferably arcuate in shape, being either oblong or circular in shape. The openings 12 can have an effective size of between 1 or 2 square millimeters and up to 40 or 50 square millimeters or greater, depending upon the particle size of the material which is to be spread. For small particle size material, such as grass seed, the openings 12 will generally be sized at the lower end of the range of sizes given above. For larger particle size material, such as granulated fertilizer, the openings 12 will preferably be sized from the mid range to the upper end of the range of sizes given above.

The spacing between openings 12 is not critical per se. Generally, the openings 12 will be spaced from each other by 1 to 3 centimeters or more. The openings 12 need not be spaced around the entire perimeter of the wall means 10, although it is, of course, within the scope of the invention to include openings 12 around the entire perimeter of the wall means 10. Generally, however, it has been found advantageous to provide the openings 12 around about one-half the perimeter of the wall means, such that the openings 12 will open away from the container and spreader package in a direction away from the person who is holding and operating the container spreader package.

Figure 3:
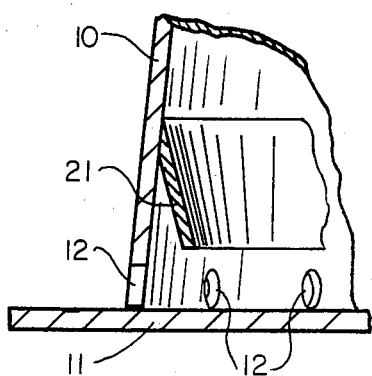
FIG. 3 is a partial cross section through the juncture of the side wall and bottom of the container and spreader package showing the openings in the side wall and an internal bulkhead ledge which prevents tight packing of the particulate material in the vicinity of the openings.
Figure 4:
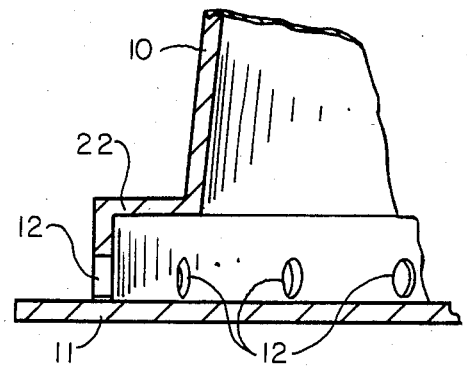
FIG. 4 is a view similar to that of FIG. 5, except that the bulkhead ledge has been replaced with an externally projecting ledge in the lower portion of the side wall which also prevents tight packing of the particulate material in the vicinity of the openings in the side wall of the container.

As can best be seen in FIGS. 3 and 4, the lower edges of the openings 12 are closely adjacent to, and most preferably tangent to the juncture between the wall means 10 and the bottom means 11. This allows particulate material to be ejected from the openings 12 as the container and spreader package is moved in an oscillatory movement about its central vertical axis, as will be described more fully hereinafter.

The container and spreader package is provided with a handle means 13 for manually holding the package and distributing particulate material therefrom. The handle extends from the container and spreader package in a manner whereby the handle means 13 can be manually grasped so as to (1) support the container and spreader package in a position in which the wall means 10 are generally upright and (2) manually move the container in oscillatory movement about a central vertical axis through the container and spreader package.

It has been found that when the handle means 13 is activated so as to make the container and spreader package oscillate back and forth about a central vertical axis through the container and spreader package, particulate material is ejected by centrifugal forces from the openings 12 in the wall means 10 and spread evenly over the ground. In a preferred embodiment of the container and spreader package of the present invention, the bottom means or bottom wall 11 extends outwardly beyond the juncture of the bottom means or impervious plate 11 and the wall means 10. The projecting extension of the bottom means 11 forms a narrow, substantially flat shelf which circumscribes the wall means and projects outwardly from the openings 12 in the wall means 10. The narrow, flat shelf forms a guide which further enhances the centrifugal projection of the particulate material from the device.

Figure 2:
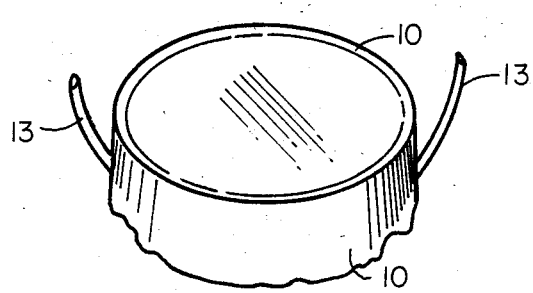
FIG. 2 is a pictorial view of the top portion of a container and spreader package similar to that shown in FIG. 1, but which has an open top.

Cover means 16 can be attached to the top of the wall means 10 as shown in FIG. 1. The cover means 16 may further have a removable cap 17 so that particulate material can be introduced into the container. Of course, the container can be open at its top with no cover as shown in FIG. 2. The open top makes it easy to add additional particulate material when desired. In the embodiment shown in FIG. 1, the removable cap 17 is removed when additional particulate material is to be added to the container. Alternatively, the fill lid could be incorporated into the discharge portion on the bottom of the container and spreader package. In such an alternative form, to change material to the container and spreader package, the package could be turned upside down, with the fill lid then being removed to fill the package. The fill lid could be adapted to be either twisted or popped off for refilling.

In a particularly preferred embodiment of the container and spreader package of the present invention, the package is used as a shipping container for the particulate material, as a display and sales container, and as an ultimate spreader for the material. The consumer or user would purchase the container filled with the particulate material. The container would likely have a sealed cover means which need not necessarily be adapted to be opened inasmuch as the user would spread the material from the package and then simply discard the package when it was empty. Alternatively, a removable cap 17 as shown in FIG. 1 could be incorporated into the package whereby additional bulk material could be added to the container and spreader package as desired. Irrespective of whether the cover means has a removable cap 17 or not, means are provided for covering the openings 12 in the wall means 10 of the container such that the particulate material could not fall from the container during shipping and display thereof. The means for covering the openings 12 must, of course, be adapted to be altered such that the openings 12 can be readily uncovered when it is desired to use the container in spreading particulate material therefrom. The means for covering the openings 12 advantageously can be an adhesive tape 20 which is applied to the wall means 10 so as to cover the openings 12. The adhesive tape 20 can be a clear tape as shown in FIG. 1, or the tape could, of course, be translucent or colored. The purchaser or user would simply pull the tape 20 from the container when the particulate material was to be spread. Another option for covering and uncovering the openings 12 can be a slip band which has openings which can be moved into and out of register with the openings 12 in the wall means 10. The slip band would be adapted to move such that the openings 12 could be completely closed, completely opened, or any degree of opening between the two extremes. This would allow the effective size of the openings 12 to be adjusted depending on the material being spread from the package.

In the embodiment of the container and spreader package illustrated in FIG. 3, a bulkhead ledge 21 extends from the interior surface of the wall means 10 immediately above the openings in the wall means 10. The bulkhead ledge 21 has been found to avoid problems in involving tight packing of the particular material in the vicinity of the openings 12. A modified means for avoiding tight packing of the particulate material in the vincinity of the openings 12 is shown in FIG. 4. In the latter embodiment, the wall means 10 projects out abruptly just above the bottom means or bottom wall 11, with the openings 12 in the wall means 10 being located in the portion which projects out, such that a ledge 22 is formed by the projecting portion of the wall means 10 above the openings 12. The bulkhead ledge 21 of FIG. 3 and the ledge 22 of FIG. 4 both tend to inhibit the particulate material in the container from forming a tightly packed mass in the vicinity of the openings 12, and as a result, it has been found that the ease in which initiation of the spreading of material from the container is enhanced.

Both the embodiments of FIG. 3 and FIG. 4 may also be described as having an outer wall 10 which terminates in an annulus spaced vertically a short distance above the bottom and vertically positioned in a plane above the openings. The openings are then spaced or positioned laterally outwardly of the annulus to provide an annular dispenser chamber for preventing clogging of the dispensing openings. As can be seen from the drawings, the combination of the wall 10 ending in an annulus spaced above the bottom and the positioning of the openings laterally outwardly of the annulus, thereby, provides an annular dispensing chamber and cooperates with the bottom 11 so that the repose angle or rest angle of the particulate matter will be such that the particulate matter will not flow over the bottom 11 when the container and spreader is in a rest position. The extension of the bottom 11 to provide a lateral guide surface for the material exiting the openings, extends a distance from the juncture of the wall 10 and the bottom 11 which is greater than the height of the openings 12. This provision, ensures that the particulate matter in a rest position will not flow over the edge of the extension of bottom 11.

Although preferred embodiments of a combination container and spreader package have been illustrated and described, it is to be understood that the present disclosure is made by way of example and that various other embodiments are possible without departing from the subject matter coming within the scope of the following claims, which subject matter is regarded as the invention.

I claim:

1. A combination container and spreader package for particulate material, comprising:
    (a) wall means;
    (b) bottom means attached to the bottom of said wall means;
    (c) cover means attached to the top of said wall means;
    (d) said wall means, bottom means and cover means defining a container for holding said particulate matter;
    (e) a plurality of openings through said wall means, said openings being formed in a single row and spaced around the bottom portion of the wall means so that each of said openings is adjacent the juncture of the wall means and the bottom means;
    (f) said wall means having an annulus spaced vertically a short distance above the bottom means and vertically positioned in a plane above the openings;
    (g) said openings being positioned laterally outwardly of said annulus to provide an annular dispensing chamber for preventing clogging of said openings;
    (h) said bottom means being a flat impervious plate extending a substantial distance beyond said openings, the distance being substantially greater than the height of the openings to provide a lateral guide surface for the material exiting said openings and to provide lateral transmission of said material rather than downward transmission of said material and so as to provide a surface for said material which prevents said material from flowing over an outward edge of said bottom when said container and spreader is in a rest position; and,
    (i) a handle means extending from the container in a manner whereby the handle means can be manually grasped so as to support the container in a position in which the wall means are generally upright and manually move the container in osciliatory movement about a vertical axes, thereby allowing the particulate material to be acted on by centrifugal force thereby, impelling the particulate material in a direction outward from the center of rotation of the container.

2. A combination container and spreader according to claim 1, further comprising:
    (a) removable adhesive strip means for application to the outside of said wall means thereby closing the openings immediately adjacent the lateral guide surface.

* * * * *